United States Patent
Kawabata et al.

(10) Patent No.: US 6,771,429 B2
(45) Date of Patent: Aug. 3, 2004

(54) OPTICAL SCANNER

(75) Inventors: Motonobu Kawabata, Kyoto (JP); Masahiko Kokubo, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 0 days.

(21) Appl. No.: 10/461,488

(22) Filed: Jun. 16, 2003

(65) Prior Publication Data

US 2004/0004748 A1 Jan. 8, 2004

(30) Foreign Application Priority Data

Jun. 26, 2002 (JP) ..................... P2002-186120

(51) Int. Cl.$^7$ .......... G02B 9/00; G02B 26/08; G02B 9/12; H01J 3/14
(52) U.S. Cl. .......... 359/662; 359/206; 359/784; 359/216; 250/234
(58) Field of Search ............... 359/196, 197, 359/204–207, 212–219, 662, 668, 784, 791; 250/234–236, 216

(56) References Cited

U.S. PATENT DOCUMENTS

| 5,835,280 A | * | 11/1998 | Griffith | 359/662 |
| 6,104,523 A | * | 8/2000 | Ang | 359/216 |
| 6,294,778 B1 | * | 9/2001 | Cappiello | 250/234 |
| 6,324,015 B1 | * | 11/2001 | Fuse | 359/662 |
| 6,696,681 B2 | * | 2/2004 | Kodama | 250/216 |

| 2002/0030158 A1 | 3/2002 | Kadama |

FOREIGN PATENT DOCUMENTS

| EP | 0 433 853 A2 | 6/1991 |
| EP | 1 048 939 A1 | 10/2000 |
| JP | 60153017 | 8/1985 |
| JP | 3-249722 | 7/1991 |
| JP | 3024908 | 1/2000 |

* cited by examiner

Primary Examiner—Georgia Epps
Assistant Examiner—Jack Dinh
(74) Attorney, Agent, or Firm—McDermott Will & Emery LLP

(57) ABSTRACT

An optical scanner according to the present invention comprises a first imaging optical system consisting of a collimator lens and a cylindrical lens, a light deflector reflecting/deflecting a light beam for scanning, and a second imaging optical system consisting of an f-θ lens and an anamorphic lens. The f-θ lens has three groups of lenses, i.e., a first lens having negative refracting power, a second lens having positive refracting power and a third lens having positive refracting power. The f-θ lens is formed to satisfy relational expressions L/f<0.100 and 0.10≦r1/r3≦0.26, where L represents the total length of the f-θ lens, f represents the focal distance of the f-θ lens, r1 represents the radius of curvature of a light beam entrance-side refracting interface of the first lens and r3 represents the radius of curvature of a light beam entrance-side refracting interface of the second lens. Thus, a compact optical scanner comprising an f-θ lens having a small total length L and high optical performance is provided also when increasing a focal length f as well as a scanning line length W.

14 Claims, 13 Drawing Sheets

OPTICAL SCANNER

BACKGROUND OF THE INVENTION

1. Field of the Invention

The present invention relates to an optical scanner reflecting/deflecting a light beam such as a laser beam for scanning an object.

2. Description of the Background Art

In general, a two-dimensional image apparatus such as a laser printer or a scanner is mounted with an optical scanner precisely scanning an object with a laser beam. This type of optical scanner reflects/deflects the laser beam with a light deflector such as a galvanometer mirror or a polygon mirror for scanning an objective surface of a photosensitive drum or the like. While the light deflector rotates at an equiangular velocity, the laser beam must scan the objective surface at a uniform rate. Therefore, the optical scanner employs an f-θ (ef-theta) lens as an optical system letting the laser beam reflected/deflected by the light deflector scan the objective surface at a uniform rate. The f-θ lens is an optical system having a distortion characteristic satisfying y=fω(f: focal distance, ω: half angle of view) in relation to an ideal image height y.

FIGS. 11 and 12 show a conventional optical scanner mounted with an f-θ lens 104. FIG. 11 is a schematic block diagram of the optical scanner developed along a Y-Z plane, and FIG. 12 is a longitudinal sectional view developing the optical scanner shown in FIG. 11 along an optical axis. Referring to FIGS. 11 and 12, numeral 100 denotes a light source (semiconductor laser), numeral 101 denotes a collimator lens, numeral 102 denotes a cylindrical lens, numeral 103 denotes a polygon mirror, numeral 104 denotes the f-θ lens, numeral 105 denotes an anamorphic lens and numeral 106 denotes an objective surface. Directions X, Y and Z shown in FIGS. 11 and 12 are perpendicular to each other.

The light source 100 oscillates a laser beam 107 directly modulated by a driving circuit (not shown). This laser beam 107 is parallelized by the collimator lens 101 and converged by the cylindrical lens 102 for forming a linear image on a reflecting surface 103r of the polygon mirror 103. The polygon mirror 103 rotates about a rotational axis 103c by tens of thousands of revolutions per minute and the f-θ lens 104 is an optical system converting equiangular velocity motion of incident light from the reflecting surface 103r to uniform motion, whereby a light beam reflected by the reflecting surface 103r of the polygon mirror 103 is deflected at an equilateral velocity and scans the objective surface 106 in the direction Y. The anamorphic lens 105 converges light incident from the f-θ lens 104 perpendicularly (direction X) to a primary scanning direction (direction Y) for forming an image on the objective surface 106.

As shown in FIG. 11, the light beam scans the objective surface 106 over a scanning line length W, and hence the f-θ lens 104 must have a wide total angle θ of view. Further, the size of an image has recently been so increased that an optical scanner having a large scanning line length W is required. Assuming that f represents the focal distance of the f-θ lens 104 at the working wavelength for the light beam, the following relational expression holds:

W=fθ

When the scanning line length W is enlarged while keeping the total angle θ of view constant, therefore, the focal distance f of the f-θ lens 104 is increased. In order to enlarge the scanning line length W while keeping the focal distance f of the f-θ lens 104 constant, on the other hand, the total angle θ of view must be increased. In this case, the aperture of the f-θ lens 104 is so increased that it is difficult to precisely work the f-θ lens 104 and correct optical aberration values thereof, to readily increase the cost for the f-θ lens 104.

Compactification of the optical scanner has also been required in recent years. As shown in FIG. 13, an f-θ lens 104 built in the optical scanner is formed by three groups of lenses, i.e., a first lens 111 having negative refracting power, a second lens 112 having positive refracting power an a third lens 113 having positive refracting power. Between the total length L (face-to-face distance between an entrance-side curved surface 111i of the first lens 111 and an exit-side curved surface 113e of the third lens 113) of the f-θ) lens 104 and a focal distance f, the following relational expression holds:

$$0.100 \leq L/f \leq 0.108$$

Hence, the total length L exceeds 0.100×f. An f-θ lens having optical performance not deteriorated also when the total length L is further reduced has recently been required.

SUMMARY OF THE INVENTION

The present invention is directed to an optical scanner reflecting/deflecting a light beam such as a laser beam for scanning an object.

According to the present invention, the optical scanner comprises a light deflector periodically reflecting a light beam emitted from a light source to periodically deflect said light beam and an imaging optical system having such a distortion characteristic that the product of a focal distance and a half angle of view defines an ideal image height for imaging the light beam deflected by the light deflector on an objective surface, and the imaging optical system comprises a first lens having negative refracting power, a second lens having positive refracting power and a third lens having positive refracting power successively from an entrance side for the light beam to satisfy the following expressions (1) and (2):

$$\frac{L}{f} < 0.100 \qquad (1)$$

$$0.10 \leq \frac{r1}{r3} \leq 0.26 \qquad (2)$$

where L represents the length between a plane of incidence of the first lens and a plane of exit of the third lens along an optical axis direction and f represents the composite focal distance of the first lens, the second lens and the third lens in the above expression (1) while r1 represents the radius of curvature of a refracting interface on the entrance side for the light beam in the first lens and r3 represents the radius of curvature of a refracting interface on the entrance side for the light beam in the second lens in the above expression (2).

A compact imaging optical system can be formed with a total length L smaller as compared with a focal distance f by satisfying the above expression (1), thereby implementing a compact optical scanner. Further, the imaging optical system can properly correct bending of a meridional image surface by satisfying the above expression (2). According to the present invention, both conditions of the above expressions (1) and (2) are compatible with each other, whereby a compact optical scanner having high optical performance can be manufactured.

Preferably, the first lens, the second lens and the third lens are made of an optical material satisfying the following expression (4) on the basis of a partial Abbe's number $\nu$ defined in the following expression (3):

$$\nu = \frac{N_A - 1}{N_{MIN} - N_{MAX}} \quad (3)$$

$$1.40 \le \frac{\nu_{ps}}{\nu_{ng}} \le 1.70 \quad (4)$$

where $N_A$ represents a refractive index with respect to the central wavelength of a working wave range of the light beam, $N_{MIN}$ represents a refractive index with respect to the lower limit of the working wave range of the light beam and $N_{MAX}$ represents a refractive index with respect to the upper limit of the working wave range of the light beam in the above expression (3) while $\nu_{ps}$ represents the partial Abbe's number of the second lens and the third lens and $\nu_{ng}$ represents the partial Abbe's number of the first lens in the above expression (4).

An imaging optical system capable of correcting on-axis chromatic aberration within tolerance can be implemented by satisfying the above expression (4).

More preferably, the imaging optical system satisfies the following expression (5):

$$0.26 \le \frac{|f1|}{f} \le 0.33 \quad (5)$$

where f1 represents the focal distance of the first lens in the above expression (5).

An imaging optical system capable of further properly correcting bending of a meridional image surface can be implemented by satisfying the above expression (5).

More preferably, the imaging optical system is formed to satisfy the following expression (6):

$$0.41 \le \frac{f3}{f} \le 0.66 \quad (6)$$

where f3 represents the focal distance of the third lens in the above expression (6).

An imaging optical system capable of improving a scanning property of a light beam can be implemented by satisfying the above expression (6).

More preferably, another imaging optical system converging the light beam emitted from the light source only in the direction of the rotational axis of the light deflector and imaging the light beam on a reflecting surface of the light deflector is further provided on an optical path between the light source and the light deflector, and the imaging optical system further comprises an anamorphic lens converging a light beam outgoing from the third lens in the direction of the rotational axis of the light deflector and imaging the light beam on the objective surface.

When displacement is present in perpendicularity of the reflecting surface of the light deflector, inclination of reflected light resulting from this displacement can be so corrected that the light beam can precisely scan the objective surface at a regular pitch.

When employing a light beam having a central wavelength of around 405 nm, the imaging optical system more preferably satisfies the following expression (2A):

$$0.10 \le \frac{r1}{r3} \le 0.26 \quad (2A)$$

A compact imaging optical system capable of properly correcting bending of a meridional image surface can be implemented particularly with respect to the light beam having the central wavelength of around 405 nm.

When employing the light beam having the central wavelength of around 405 nm, the optical material more preferably satisfies the following expression (4A) with respect to the light beam having the central wavelength of around 405 nm:

$$1.44 \le \frac{\nu_{ps}}{\nu_{ng}} \le 1.70 \quad (4A)$$

An imaging optical system capable of correcting on-axis chromatic aberration within a proper range can be implemented particularly with respect to the light beam having the central wavelength of around 405 nm.

When employing the light beam having the central wavelength of around 405 nm, the imaging optical system more preferably satisfies the following expression (5A) with respect to the light beam having the central wavelength of around 405 nm:

$$0.28 \le \frac{|f1|}{f} \le 0.33 \quad (5A)$$

An imaging optical system capable of properly correcting bending of a meridional image surface can be implemented particularly with respect to the light beam having the central wavelength of around 405 nm.

When employing a light beam having a central wavelength of around 635 nm, the imaging optical system more preferably satisfies the following expression (2B):

$$0.11 \le \frac{r1}{r3} \le 0.25 \quad (2B)$$

A compact imaging optical system capable of properly correcting bending of a meridional image surface can be implemented particularly with respect to the light beam having the central wavelength of around 635 nm.

When employing the light beam having the central wavelength of around 635 nm, the optical material more preferably satisfies the following expression (4B) with respect to the light beam having the central wavelength of around 635 nm:

$$1.50 \le \frac{\nu_{ps}}{\nu_{ng}} \le 1.62 \quad (4B)$$

An imaging optical system capable of correcting on-axis chromatic aberration within a proper range can be implemented particularly with respect to the light beam having the central wavelength of around 635 nm.

When employing the light beam having the central wavelength of around 635 nm, the imaging optical system more preferably satisfies the following expression (5B) with respect to the light beam having the central wavelength of around 635 nm:

$$0.30 \le \frac{|fl|}{f} \le 0.33 \qquad (5B)$$

An imaging optical system capable of properly correcting bending of a meridional image surface can be implemented particularly with respect to the light beam having the central wavelength of around 635 nm.

When employing a light beam having a central wavelength of around 785 nm, the imaging optical system more preferably satisfies the following expression (2C):

$$0.12 \le \frac{rl}{r3} \le 0.21 \qquad (2C)$$

A compact imaging optical system capable of properly correcting bending of a meridional image surface can be implemented particularly with respect to the light beam having the central wavelength of around 785 nm.

When employing the light beam having the central wavelength of around 785 nm, the optical material more preferably satisfies the following expression (4C) with respect to the light beam having the central wavelength of around 785 nm:

$$1.40 \le \frac{v_{ps}}{v_{ng}} \le 1.70 \qquad (4C)$$

An imaging optical system capable of correcting on-axis chromatic aberration within a proper range can be implemented particularly with respect to the light beam having the central wavelength of around 785 nm.

When employing the light beam having the central wavelength of around 785 nm, the imaging optical system more preferably satisfies the following expression (5C) with respect to the light beam having the central wavelength of around 785 nm:

$$0.26 \le \frac{|fl|}{f} \le 0.31 \qquad (5C)$$

An imaging optical system capable of properly correcting bending of a meridional image surface can be implemented particularly with respect to the light beam having the central wavelength of around 785 nm.

Accordingly, an object of the present invention is to provide a compact optical scanner comprising an f-θ lens having a small total length L and high optical performance also when a focal distance f as well as a scanning line length W are increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described.

Overall Structure of Optical Scanner

Figure 1:
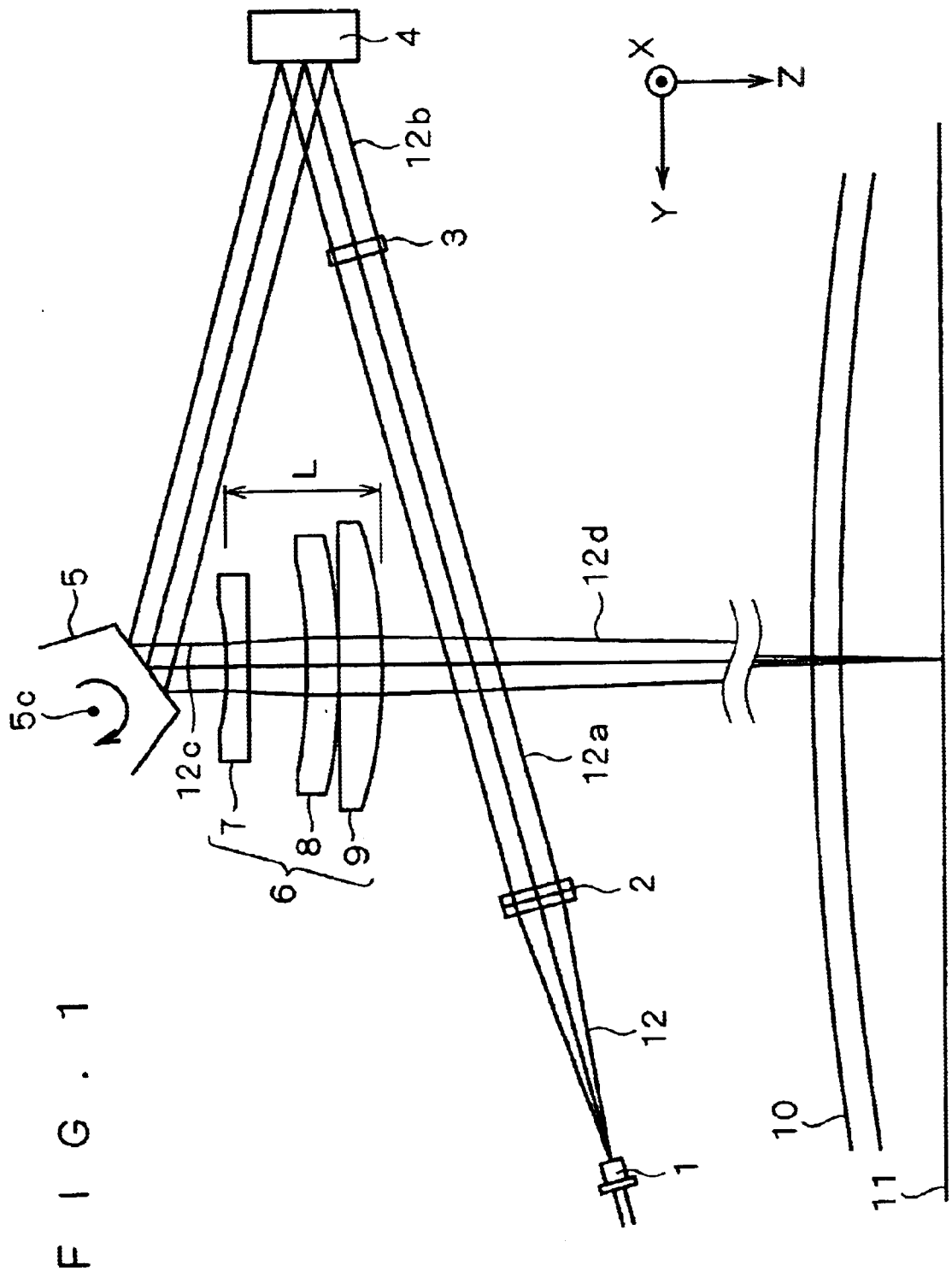
FIG. 1 is a schematic diagram showing the overall structure of an optical scanner according to each embodiment of the present invention.
Figure 2:
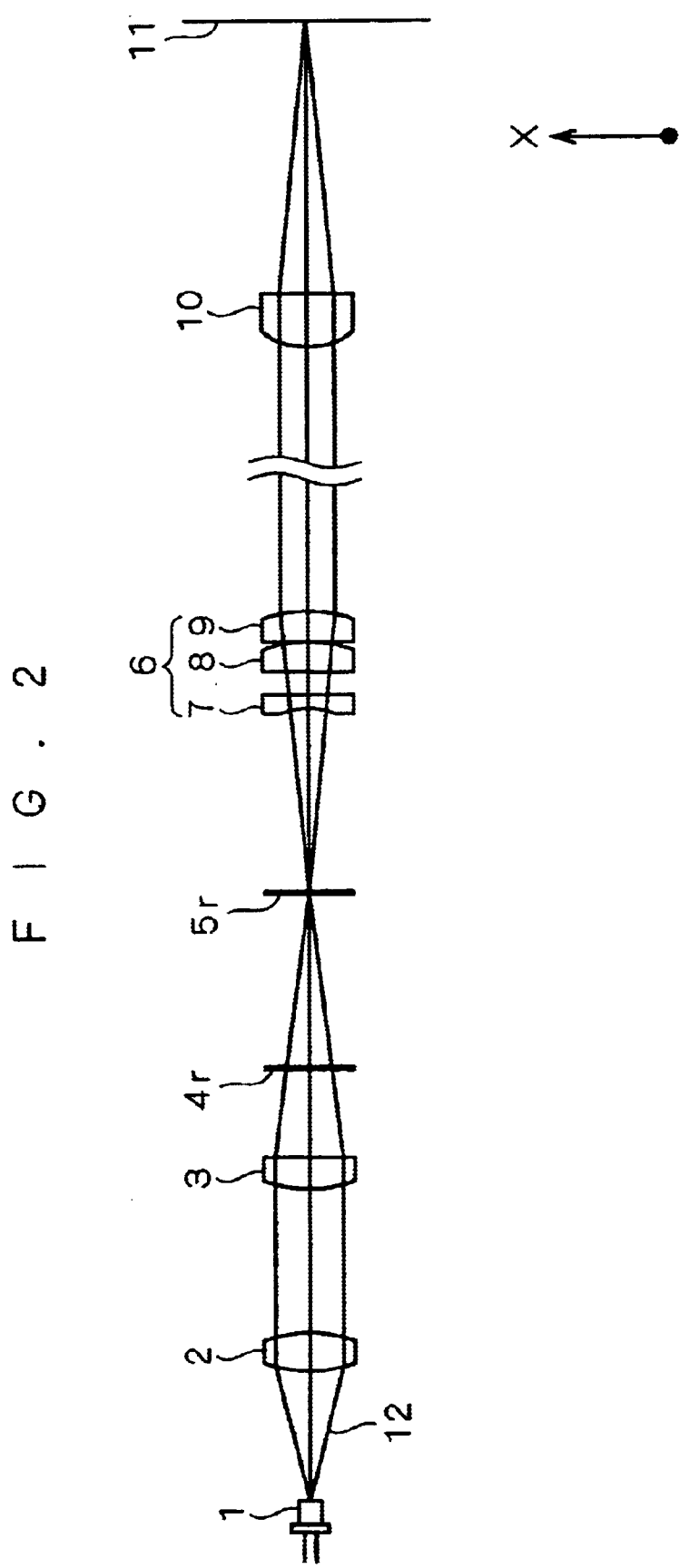
FIG. 2 is a vertical sectional view developing the optical scanner shown in FIG. 1 along an optical axis.

FIG. 1 is a schematic diagram showing the overall structure of an optical scanner according to each embodiment of the present invention. Directions X, Y and Z shown in FIG. 1 are perpendicular to each other. FIG. 1 shows the schematic structure of the optical scanner developed along a Y-Z plane parallel to the plane of FIG. 1. FIG. 2 is a vertical sectional view developing the optical scanner shown in FIG. 1 along an optical axis.

This optical scanner comprises a first imaging optical system consisting of a collimator lens 2 and a cylindrical lens 3, a plane mirror 4, a light deflector 5 having a polygon mirror and a second imaging optical system consisting of an f-θ lens 6 and an anamorphic lens 10. While this embodiment employs the polygon mirror as the light deflector 5, the present invention is not restricted to this but a galvanometer mirror or the like may alternatively be employed.

A light source 1 consisting of a semiconductor laser oscillates a light beam 12 having a prescribed central wavelength and outputs the same toward the collimator lens 2. In the first imaging optical system, the collimator lens 2 refracts the incident light beam 12 to a parallel beam. Then, the cylindrical lens 3 converges incident light 12a from the collimator lens 2 only in the direction (direction X) of a rotational axis 5c of the light deflector 5. A light beam 12b outgoing from the cylindrical lens 3 is reflected by the plane mirror 4 and thereafter forms a linear image on a reflecting surface 5r of the light deflector 5.

The reflecting surface 5r of the light deflector 5 is parallelly worked with respect to the rotational axis 5c. This reflecting surface 5r rotates about the rotational axis 5c clockwise at a high equiangular velocity for deflecting the light beam 12c reflected by the reflecting surface 5r in the direction (direction Z) of the optical axis of the f-θ lens 6 for performing scanning. The f-θ lens 6 forming the second imaging optical system, having such a distortion characteristic that the product of a focal distance f and a half angle ω of view defines an ideal image height y, lets the incident light beam 12c deflected at the equiangular velocity scan an objective surface 11 in a primary scanning direction (direction Y) at a uniform rate.

The anamorphic lens 10 converges a light beam 12d incident from the f-θ lens 6 in a secondary scanning direction (direction X) perpendicular to the primary scanning direction (direction Y) and also perpendicular to the optical axis of the f-θ lens 6 for forming an image on the objective surface 11. This anamorphic lens 10 has a characteristic of correcting displacement of reflected light resulting from displacement of perpendicularity of the reflecting surface 5r of the light deflector 5 (pyramidal error correction) and a characteristic of correcting bending of a sagittal image surface described later. The light deflector 5 is formed with a plurality of reflecting surfaces in a sectionally polygonal manner. Each reflecting surface may be slightly radially inclined from the direction of the rotational axis 5c due to dispersion in accuracy of finishing. The direction of deflection of the light beam 12c incident upon the f-θ lens 6 is slightly displaced in the direction X due to such inclination of the reflecting surface. According to this embodiment, the anamorphic lens 10 converging the light beam 12d in the secondary scanning direction is introduced as shown in FIG. 2, whereby the reflecting surface 5r and a final image surface on the objective surface 11 are in optically conjugate relation. Even if the traveling direction of the light beam 12c is slightly displaced due to inclination of the reflecting surface 5r, therefore, the light beam 12c can perform scanning to an imaging point conjugate to the reflecting surface 5r, so that the light beam 12c can precisely scan the objective surface 11 at an equiangular velocity (uniform pitch).

The f-θ lens 6 forms bent image surfaces in a meridional image surface and the sagittal image surface. In general, a beam on a plane (meridional plane) including the optical axis of the f-θ lens 6 and a principal ray defines a meridional beam. In this optical scanner, the meridional plane is a Y-Z plane including the optical axis of the f-θ lens 6 and parallel to the primary scanning direction (direction Y), and the meridional image surface is an image surface formed by the meridional beam on the meridional plane. A beam including the principal ray and perpendicular to the meridional beam defines a sagittal beam. The sagittal image surface is defined as an image surface formed by the sagittal beam. As described later, the f-θ lens 6 according to this embodiment has optical performance of correcting bending of the meridional image surface. Further, the anamorphic lens 10, having refracting power in the primary scanning direction (direction Y) and that in the secondary scanning direction (direction X) different from each other, has optical performance of converging and imaging the incident light beam 12d in the secondary scanning direction while correcting bending of the sagittal image surface thereof.

While the anamorphic lens 10 and the f-θ lens 6 are separated from each other in this embodiment, the present invention is not restricted to this but the anamorphic lens 10 may alternatively be integrated with the f-θ lens 6 as a partial component thereof.

As shown in FIG. 1, the light beam 12a directed toward the cylindrical lens 3 from the collimator lens 2 in the first imaging optical system reaches the plane mirror 4 across an optical path between the f-θ lens 6 and the anamorphic lens 10 in the second imaging optical system and is reflected by the same, for forming an image on a mirror surface of the light deflector 5. A necessary optical path length can be ensured in the limited space of the optical scanner due to such arrangement of the first and second imaging optical systems, whereby the optical scanner can be designed compact. Further, the degree of freedom in design is increased as the total length L of the f-θ lens 6 is reduced, whereby the optical scanner can be readily compactified.

Structure of f-θ Lens

Figure 3:
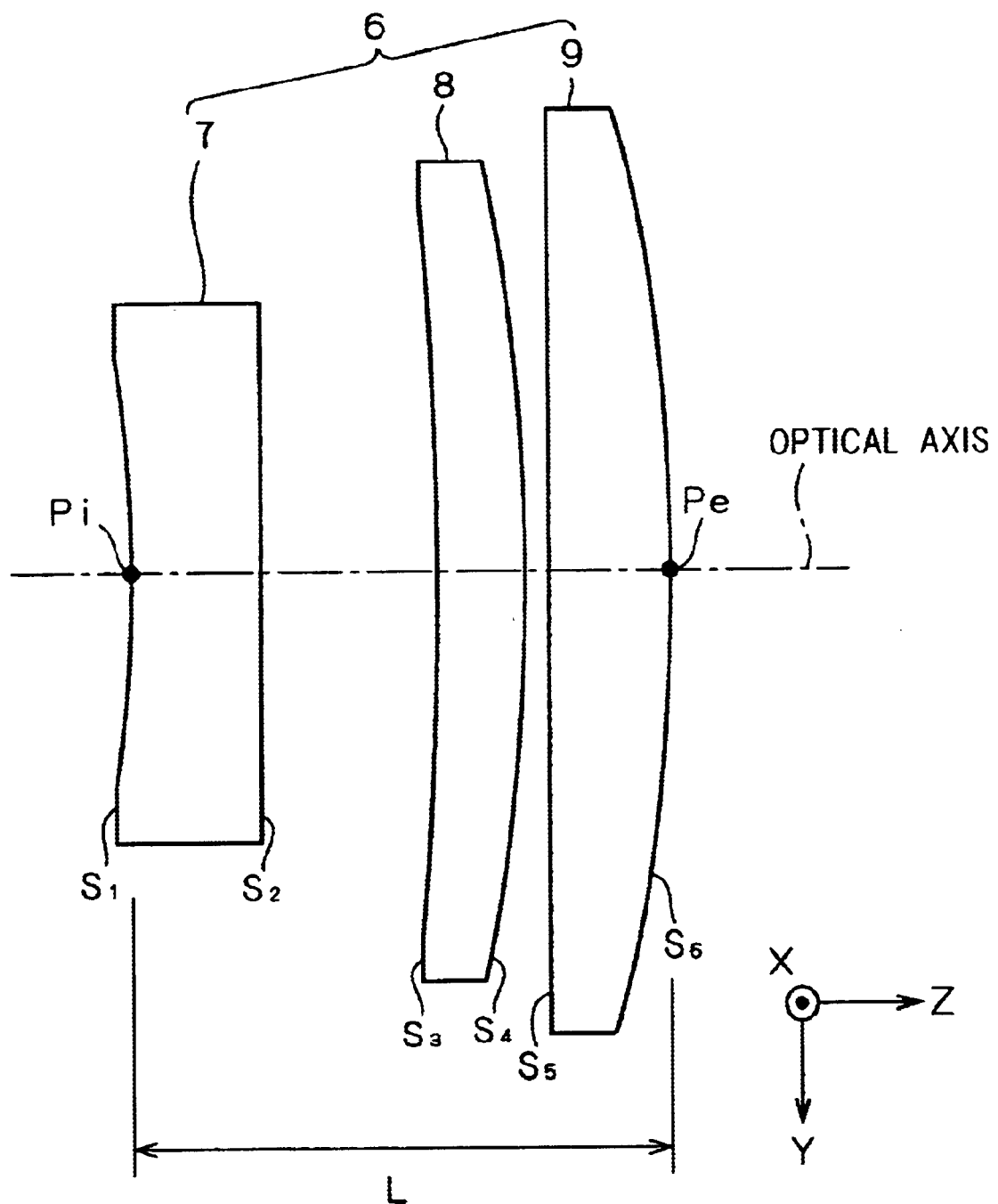
FIG. 3 is a schematic sectional view of an f-θ lens according to each embodiment.

FIG. 3 is a schematic sectional view of the aforementioned f-θ lens 6. This f-θ lens 6 is formed by three groups of lenses, i.e., a first lens 7 having negative refracting power, a second lens 8 having positive refracting power and a third lens 9 having positive refracting power successively from an entrance side for the light beam 12c. The refracting power of each lens is defined as the inverse number (=1/f) of the focal distance f of this lens.

The f-θ lens 6 has the dimension of the total length L in the optical axis direction. More specifically, the total length L denotes the distance between a point Pi on the optical axis of a refracting interface $S_1$ of the first lens 7 on an entrance side for the light beam 12c and a point Pe on the optical axis of a refracting interface $S_6$ of the third lens 9 on an exit side for the light beam 12d. Assuming that f represents the focal distance of the f-θ lens 6, i.e., the composite focal distance of the first to third lenses 7 to 9, the f-θ lens 6 is formed to satisfy the following conditional expression (1):

$$\frac{L}{f} < 0.100 \qquad (1)$$

The f-θ lens 6 having the total length L extremely small as compared with the focal distance f can be prepared by satisfying the above expression (1).

Assuming that r1 represents the radius of curvature of the refracting interface $S_1$ of the first lens 7 on the entrance side for the light beam 12c and r3 represents the radius of curvature of the refracting interface $S_6$ of the third lens 9 on the exit side for the light beam 12d, the f-θ lens 6 is formed to further satisfy the following conditional expression (2):

$$0.10 \leq \frac{r1}{r3} \leq 0.26 \qquad (2)$$

The f-θ lens 6 can correct bending of the meridional image surface by satisfying the above expression (2). When the ratio r1/r3 exceeds the upper limit (=0.26) of the above expression (2), the meridional image surface is bent toward a plus side with respect to an on-axis image point and overcorrected. When the ratio r1/r3 is less than the lower limit (=0.10) of the above expression (2), on the other hand, the meridional image surface is bent toward a minus side with respect to the on-axis image point and undercorrected. Therefore, the f-θ lens 6 can properly flatten the meridional image surface by setting the ratio r1/r3 in the numerical range defined by the above expression (2). In the field of a laser printer, for example, the spot diameter of the light beam 12d scanning the objective surface 11 is preferably small in order to obtain an image of high resolution. The f-θ lens 6 can uniformly suppress the spot diameter of the light beam 12d scanning the objective surface 11 by correcting image surface bending.

Hyaline or an optical plastic material defined by a partial Abbe's number ν is preferably selected as the optical materials for the first, second and third lenses 7, 8 and 9. The partial Abbe's number ν is defined as follows:

$$\nu = \frac{N_A - 1}{N_{MIN} - N_{MAX}} \qquad (3)$$

where $N_A$ represents the refractive index of the optical material with respect to the central wavelength of the light beam 12c, $N_{MIN}$ represents the refractive index of the optical material with respect to the lower limit (minimum wavelength) of the working wave range of the light beam 12c and $N_{MAX}$ represents the refractive index of the optical material with respect to the upper limit (maximum wavelength) of the working wave range of the light beam 12c in the above expression (3). The dominator of the partial Abbe's number ν expresses refractive index change with respect to wavelength change between the maximum and minimum wavelengths of the light beam 12c, and the partial Abbe's number ν expresses the ratio of the refractive index $N_A$ with respect to the refractive index change. Dispersiveness of the optical material is increased as the partial Abbe's number ν is reduced, while the former is reduced as the latter is increased.

Between the partial Abbe's number $v_{ng}$ of the first lens 7 having negative refracting power and the partial Abbe's number $v_{ps}$ of the second and third lenses 8 and 9 having positive refracting power, the following conditional expression (4) preferably holds:

$$1.40 \leq \frac{v_{ps}}{v_{ng}} \leq 1.70 \quad (4)$$

Chromatic aberration includes on-axis chromatic aberration (difference in imaging position on an optical axis varying with the wavelength of a light beam) and magnification chromatic aberration (difference in imaging position on an image height direction varying with the wavelength of the light beam). The on-axis chromatic aberration of the f-θ lens 6 can be corrected within tolerance by selecting dispersiveness of the optical material for the first lens 7 to be higher than that of the optical material for the second and third lenses 8 and 9 and setting the ratio $v_{ps}/v_{ng}$ within the numerical range defined by the above expression (4).

In order to correct curvature of field of the aforementioned f-θ lens 6, the following conditional expression (5) preferably holds as to the focal distance f1 (<0) of the aforementioned first lens 7:

$$0.26 \leq \frac{|f1|}{f} \leq 0.33 \quad (5)$$

The f-θ lens 6 can further properly correct bending of the meridional image surface by satisfying the above expression (5). When the ratio |f1|/f exceeds the upper limit (=0.33) of the above expression (5), the meridional image surface is bent toward a plus side with respect to an on-axis image point and overcorrected. When the ratio |f1|/f is less than the lower limit (=0.26) of the above expression (5), on the other hand, the meridional image surface is bent toward a minus side with respect to the on-axis image point and undercorrected. Therefore, the f-θ lens 6 can properly flatten the meridional image surface by setting the ratio |f1|/f within the numerical range defined by the above expression (5).

In order to improve the scanning characteristic (linearity) of the light beam 12d forming an image on the objective surface 11, the following conditional expression (6) preferably holds as to the focal distance f3 (>0) of the aforementioned third lens 9:

$$0.41 \leq \frac{f3}{f} \leq 0.66 \quad (6)$$

The above expression (6) expresses setting of the ratio f3/f of the focal distance f3 of the third lens 9 to the focal distance f of the f-θ lens 6 within a prescribed range. When the ratio f3/f exceeds the upper limit (=0.66) of the above expression (6), the scanning rate of the light beam 12d on the objective surface 11 is retarded toward the peripheral portion from the central portion. When the ratio f3/f is less than the lower limit (=0.41) of the above expression (6), on the other hand, the scanning rate is quickened toward the peripheral portion from the central portion. When the above conditional expression (6) is satisfied, therefore, time change of the scanning rate is suppressed within tolerance so that the light beam 12d can precisely scan the objective surface 11 at a regular pitch for enabling improvement of picture quality.

More specific modes of the f-θ lens 6 having the aforementioned structure are now described.

First Embodiment

An f-θ lens 6 according to a first embodiment of the present invention is now described. The f-θ lens 6 is designed to be preferable as to a light beam having a working wave range of a central wavelength of 405 nm, a maximum wavelength of 410 nm and a minimum wavelength of 400 nm. In order to optimize optical performance with respect to this working wave range in particular, the f-θ lens 6 preferably satisfies the following conditional expressions (2A), (4A) and (5A):

$$0.10 \leq \frac{r1}{r3} \leq 0.26 \quad (2A)$$

$$1.44 \leq \frac{v_{ps}}{v_{ng}} \leq 1.70 \quad (4A)$$

$$0.28 \leq \frac{|f1|}{f} \leq 0.33 \quad (5A)$$

An example of the f-θ lens 6 according to this embodiment is now described. Table 1 shows the focal distance f and the F-number of the f-θ lens 6 according to this example and a working wave range of a laser beam oscillated in a light source 1.

TABLE 1

| F-Number | F/41 |
|---|---|
| Focal Distance (f) | f = 700 mm |
| Total Angle of View (θ) | 45° |
| Central Wavelength ($\lambda_0$) | $\lambda_0$ = 405 nm |
| Upper Limit of Working Wave Range ($\lambda_{max}$) | $\lambda_{max}$ = 410 nm |
| Lower Limit of Working Wave Range ($\lambda_{min}$) | $\lambda_{min}$ = 400 nm |

As shown in FIG. 3, first, second and third lenses 7, 8 and 9 have refracting interfaces $S_1$, $S_2$, $S_3$, $S_4$, $S_5$ and $S_6$. It is assumed that r(1), r(2), r(3), r(4), r(5), and r(6) represent the radii of curvature of the refracting interfaces $S_1$, $S_2$, $S_3$, $S_4$, $S_5$ and $S_6$ respectively and d(i) represents the face-to-face distance between an i-th refracting interface $S_i$ (i: integer of 1 to 5) and an i+1-th refracting interface $S_{i+1}$ on an optical axis. The total sum of face-to-face distances d(i) related to the refracting interfaces $S_1$ to $S_6$ is equal to the total length L of the f-θ lens 6. It is also assumed that $n_d(1)$, $n_d(3)$ and $n_d(5)$ represent the refractive indices of the first, second and third lenses 7, 8 and 9 on d-line and $v_d(1)$, $v_d(3)$ and $v_d(5)$ represent the Abbe's numbers of the first, second and third lenses 7, 8 and 9 on d-line respectively. Table 2 shows values indicating optical characteristics of the f-θ lens 6.

TABLE 2

| i | r(i) | d(i) | $n_d(i)$ | $v_d(i)$ |
|---|------|------|----------|----------|
| 1 | −132.64265 | 9 | 1.60562 | 43.7 |
| 2 | ∞ | 22.158697 | | |
| 3 | −518.34390 | 15 | 1.64000 | 60.1 |
| 4 | −212.01866 | 0.5 | | |
| 5 | ∞ | 15 | 1.64000 | 60.1 |
| 6 | −202.76424 | | | |

Referring to Table 2, r(2)=r(5)=∞. This means that the second and fifth refracting interfaces $S_2$ and $S_5$ have flat shapes with zero curvature.

The numerical values of the ratios used in the above conditional expressions (1), (2), (4), (5) and (6) are as follows:

$$\begin{cases} L/F = 0.088 \\ r1/r3 = 0.256 \\ v_{ps}/v_{ng} = 1.531 \\ N_{ng} = 1.630016 \quad N_{ng1} = 1.628796 \quad N_{ng2} = 1.631293 \quad v_{ng} = 252.3091 \\ N_{ps} = 1.657779 \quad N_{ps1} = 1.656944 \quad N_{ps2} = 1.658647 \quad v_{ps} = 386.2472 \\ |f1|/f = 0.301 \quad f1 = -210.538696074 \\ f3/f = 0.440 \quad f3 = 308.256095217 \end{cases}$$

where $N_{ps}$ represents the refractive index of the second and third lenses 8 and 9 with respect to the central wavelength 405 nm, $N_{ps1}$ represents the refractive index of the second and third lenses 8 and 9 with respect to the maximum wavelength 410 nm, $N_{ps2}$ represents the refractive index of the second and third lenses 8 and 9 with respect to the minimum wavelength 400 nm, $N_{ng}$ represents the refractive index of the first lens 7 with respect the central wavelength 405 nm, $N_{ng1}$ represents the refractive index of the first lens 7 with respect to the maximum wavelength 410 nm and $N_{ng2}$ represents the refractive index of the first lens 7 with respect to the minimum wavelength 400 nm.

It is understood that the numerical values of the aforementioned ratios L/f, r1/r3, $v_{ps}/v_{ng}$, |f1|/f and f3/f satisfy the conditional expressions (1), (2A), (4A), (5A) and (6) in this example.

Figure 4:
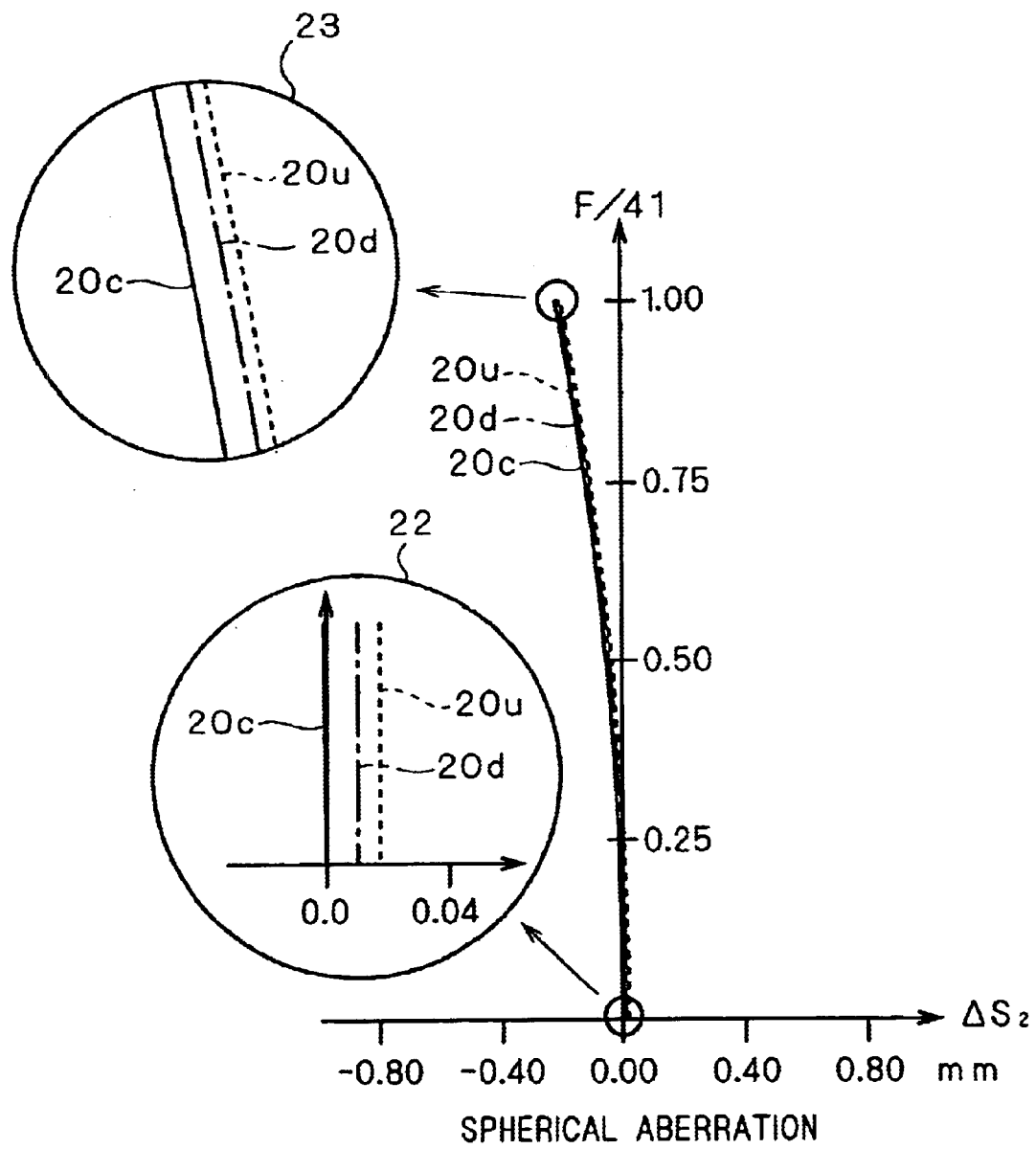
FIG. 4 is a spherical aberration diagram of an f-θ lens according to a first embodiment of the present invention.

Spherical aberration (longitudinal aberration) of the f-θ lens 6 having the aforementioned optical characteristics was measured. FIG. 4 is a spherical aberration diagram related to the light beam having the working wave range of three wavelengths (405 nm, 400 nm and 410 nm). A point where the light beam refracted by the f-θ lens 6 intersects with the optical axis varies with the height entrance in an entrance pupil (radius of the entrance pupil). Referring to the spherical aberration diagram of FIG. 4, the vertical axis shows pupil coordinates standardizing an end of the radius of the entrance pupil to "1", and the horizontal axis shows the position where the light beam refracted by the f-θ lens 6 intersects with the optical axis, i.e., spherical aberration $\Delta S_2$ (unit: mm). Aberration curves 20c, 20u and 20d correspond to the wavelengths 405 nm, 410 nm and 400 nm of the light beam respectively. Referring to FIG. 4, further, numeral 22 denotes a partially enlarged view showing the aberration curves 20c, 20u and 20d around pupil coordinates exhibiting the value zero and numeral 23 denotes a partially enlarged view showing the aberration curves 20c, 20u and 20d around pupil coordinates exhibiting the value "1".

It has been recognized from the result of measurement of the spherical aberration $\Delta S_2$ shown in FIG. 4 that on-axis chromatic aberration between the central wavelength 405 nm and the maximum wavelength 410 nm is 0.018 mm, on-axis chromatic aberration between the maximum wavelength 410 nm and the minimum wavelength 400 nm is 0.0066 mm and the on-axis chromatic aberration was properly corrected.

Figure 5:
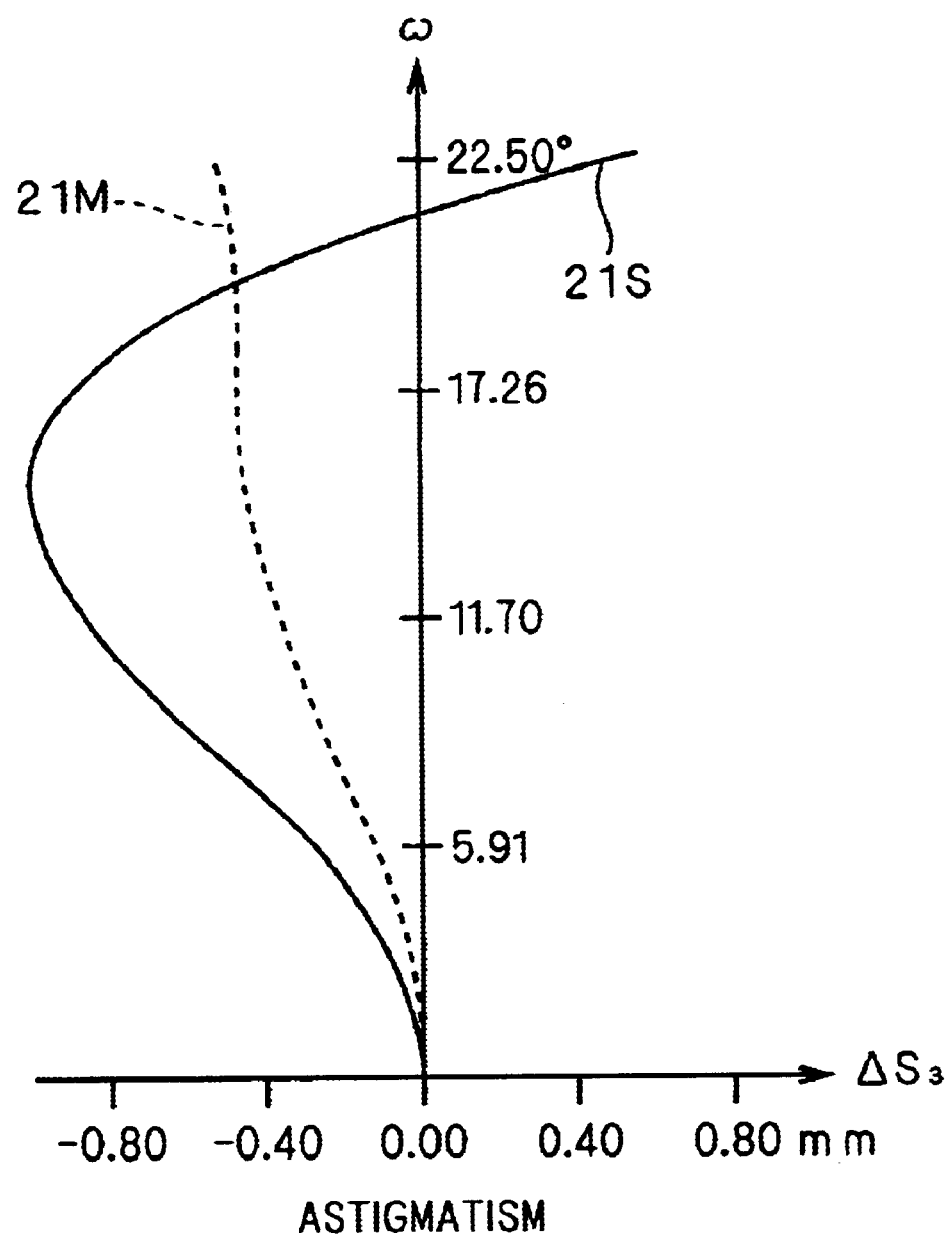
FIG. 5 is an astigmatism diagram of the f-θ lens according to the first embodiment.

Astigmatism (longitudinal aberration) of the f-θ lens 6 according to this example was measured. FIG. 5 is an astigmatism diagram related to the light beam having the central wavelength of 405 nm. Referring to FIG. 5, the horizontal axis shows displacement $\Delta S_3$ (unit: mm) of a meridional image surface and a sagittal image surface from an on-axis image point, and the vertical axis shows a half angle ω of view (unit: °). Referring to FIG. 5, further, numeral 21M denotes an aberration curve of the meridional image surface and numeral 21S denotes an aberration curve of the sagittal image surface. It is understood from FIG. 5 that the meridional image surface is relatively flatly corrected.

As to an f-θ characteristic indexing the scanning characteristic of the f-θ lens 6 according to this example, an excellent numerical value of 0.33% was obtained. The f-θ characteristic is measured along the following procedures A to E:

Procedure A: The total angle θ of view of the f-θ lens 6 is equally divided into 10 for calculating an average rotational angle <θ> of a light deflector 5 as follows:

<θ>=θ/10/2

Figure 6:
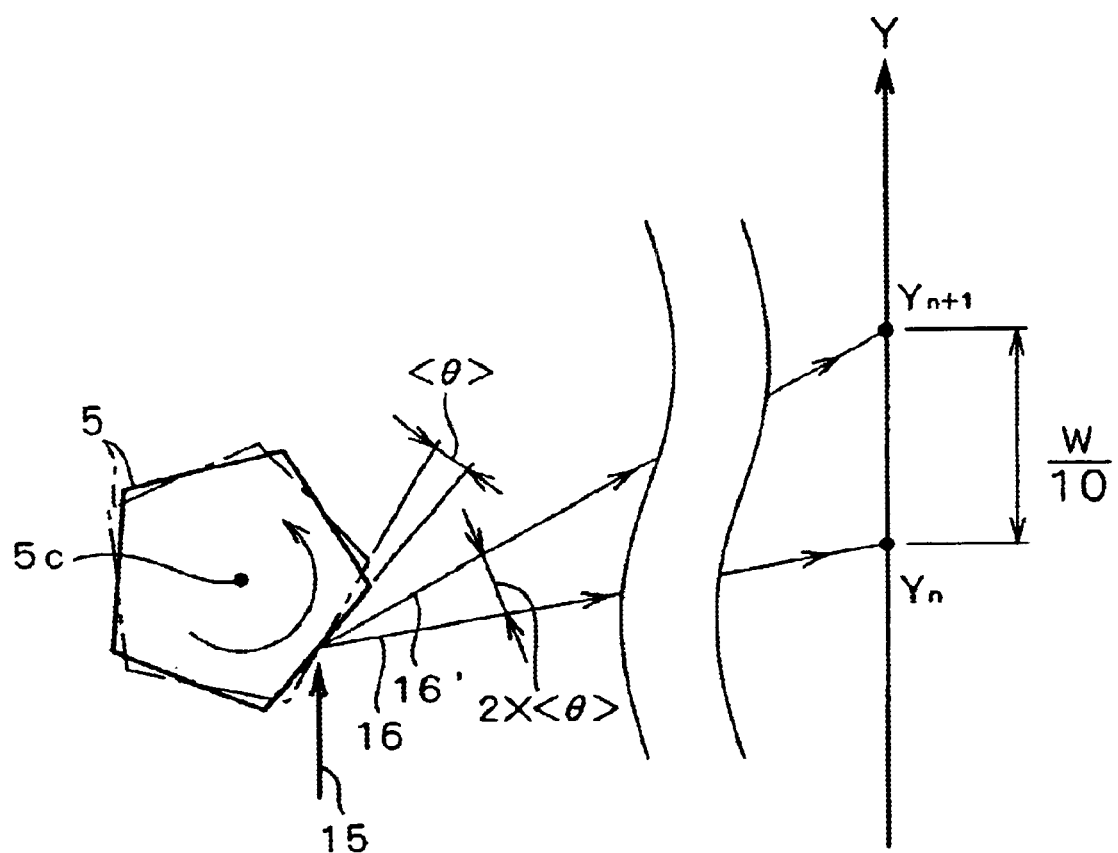
FIG. 6 is a diagram for illustrating f-θ characteristics.

As shown in FIG. 6, incident light 15 is reflected by the light deflector 5 with respect to the average rotational angle <θ> of the light deflector 5, and deflected from a light beam 16 to a light beam 16' with angle change 2×<θ>. In an ideal state where a light beam scans an objective surface 11 at a uniform rate, the scanning distance of the light beam with respect to the average rotational angle <θ> is W/10 (W=fθ: scanning line length).

Procedure B: The position of the objective surface 11 irradiated with the light beam is measured at each point when the light deflector 5 rotates by the average rotational angle <θ>. Thus, 11 irradiated positions $Y_1$ to $Y_{11}$ are measured in a period between starting and ending of single scanning. In the ideal state where the light beam scans the objective surface 11 at a uniform rate, the irradiated positions $Y_1$ to $Y_{11}$ are expressed as follows assuming that $Y_1$ represents a scanning start position on the objective surface 11:

$Y_2 = Y_1 + W/10$ $Y_3 = Y_2 + W/10$ $Y_{n+1} = Y_n + W/10$ $Y_{11} = Y_{10} + W/10$

Procedure C: The object distance $Y_{n+1} - Y_n$ (n=1 to 10) between each adjacent pair of irradiated positions is calculated. This object distance $Y_{n+1} - Y_n$ is conceivably substantially proportionate to the scanning rate of the light beam between each adjacent pair of irradiated positions.

Procedure D: The ratio $D_n$ of the object distance $Y_{n+1} - Y_n$ to the inter-irradiated position distance W/10 in the ideal state is calculated. This ratio $D_n$ (n=1 to 10) is calculated along the following expression (7):

$$D_n = (Y_{n+1} - Y_n)/(W/10) \tag{7}$$

Procedure E: Assuming that $D_{max}$ and $D_{min}$ represent the maximum and minimum values of the ratio $D_n$ (n=1 to 10)

respectively and $D_{ave}$ represents the arithmetic mean of the ratio $D_n$, the f-θ characteristic (unit: percent) is calculated along the following expression (8):

$$\text{f-θ Characteristic}=100\times(D_{max}-D_{min})/D_{ave} \qquad (8)$$

As the value of the f-θ characteristic is reduced, linearity of the f-θ lens 6 is so improved that the light beam can scan the objective surface 11 at a regular pitch.

Table 3 shows measured values of the aforementioned irradiated position $Y_n$, the aforementioned distance $Y_{n+1}-Y_n$ and the aforementioned ratio $D_n$.

TABLE 3

$D_n = (Y_{n+1} - Y_n)/(W/10)$

| n | 1 | 2 | 3 | 4 | 5 | 6 | 7 | 8 | 9 | 10 |
|---|---|---|---|---|---|---|---|---|---|---|
| $Y_{n+1}$ | 275.40959 | 220.29140 | 165.12536 | 110.01532 | 54.98260 | −0.00008 | −54.98267 | −110.01520 | −165.12518 | −220.29133 |
| $Y_n$ | 220.29140 | 165.12536 | 110.01532 | 54.98260 | −0.00008 | −54.98267 | −110.01520 | −165.12518 | −220.29133 | −275.40963 |
| $Y_{n+1} - Y_n$ | 55.11819 | 55.16604 | 55.11004 | 55.03272 | 54.98268 | 54.98259 | 55.03253 | 55.10998 | 55.16615 | 55.1183 |
| $D_n$ | 1.00215 | 1.00302 | 1.00200 | 1.00059 | 0.99969 | 0.99968 | 1.00059 | 1.00200 | 1.00302 | 1.00215 |

Table 4 shows the maximum value $D_{max}$, the minimum value $D_{min}$ and the arithmetic mean $D_{ave}$ of the ratio $D_n$ and the values of the f-θ characteristic calculated through the measured values in Table 3.

TABLE 4

| | |
|---|---|
| $D_{max}$ | 1.00302 |
| $D_{min}$ | 0.99968 |
| $D_{ave}$ | 1.00149 |
| f-θ Characteristic | 0.33% |

Second Embodiment

An f-θ lens 6 according to a second embodiment of the present invention is now described. The f-θ lens 6 is designed to be preferable as to a light beam having a working wave range of a central wavelength of 635 nm, a maximum wavelength of 645 nm and a minimum wavelength of 625 nm. In order to optimize optical performance with respect to this working wave range in particular, the f-θ lens 6 preferably satisfies the following conditional expressions (2B), (4B) and (5B):

$$0.11 \le \frac{r1}{r3} \le 0.25 \qquad (2B)$$

$$1.50 \le \frac{\nu_{ps}}{\nu_{ng}} \le 1.62 \qquad (4B)$$

$$0.30 \le \frac{|f1|}{f} \le 0.33 \qquad (5B)$$

An example of the f-θ lens 6 according to this embodiment is now described. Table 5 shows the focal distance f and the F-number of the f-θ lens 6 according to this example and a working wave range of a laser beam oscillated by a light source 1.

TABLE 5

| | |
|---|---|
| F-Number | F/31.5 |
| Focal Distance (f) | f = 700 mm |
| Total Angle of View (θ) | 45° |
| Central Wavelength ($\lambda_0$) | $\lambda_0$ = 635 nm |
| Upper Limit of Working Wave Range ($\lambda_{max}$) | $\lambda_{max}$ = 645 nm |
| Lower Limit of Working Wave Range ($\lambda_{min}$) | $\lambda_{min}$ = 625 nm |

Table 6 shows values indicating optical characteristics of the f-θ lens 6 to this example.

TABLE 6

| i | r(i) | d(i) | $n_d(i)$ | $\nu_d(i)$ |
|---|---|---|---|---|
| 1 | −135.763 | 14 | 1.67270 | 32.1 |
| 2 | 475438.2 | 19.2 | | |
| 3 | −629.566 | 15 | 1.65844 | 50.9 |
| 4 | −208.978 | 2.7 | | |
| 5 | −1299400 | 14 | 1.65844 | 50.9 |
| 6 | −210.16 | | | |

Numerical values of various ratios used in the above conditional expressions (1), (2), (4), (5) and (6) are as follows:

$$\begin{cases} L/f = 0.093 \\ r1/r3 = 0.216 \\ \nu_{ps}/\nu_{ng} = 1.528 \\ N_{ng} = 1.668273 \quad N_{ng1} = 1.667469 \quad N_{ng2} = 1.669118 \quad \nu_{ng} = 405.2595 \\ N_{ps} = 1.655627 \quad N_{ps1} = 1.655110 \quad N_{ps2} = 1.656169 \quad \nu_{ps} = 619.1000 \\ |f1|/f = 0.290 \quad f1 = -203.094555848 \\ f3/f = 0.458 \quad f3 = 320.598448029 \end{cases}$$

where $N_{ps}$ represents the refractive index of second and third lenses 8 and 9 with respect to the central wavelength 635 nm, $N_{ps1}$ represents the refractive index of the second and third lenses 8 and 9 with respect to the maximum wavelength 645 nm, $N_{ps2}$ represents the refractive index of the second and third lenses 8 and 9 with respect to the minimum wavelength 625 nm, $N_{ng}$ represents the refractive index of a first lens 7 with respect to the central wavelength 635 nm, $N_{ng1}$ represents the refractive index of the first lens 7 with respect to the maximum wavelength 645 nm and $N_{ng2}$ represents the refractive index of the first lens 7 with respect to the minimum wavelength 625 nm.

It is understood that the numerical values of ratios L/f, r1/r3, $\nu_{ps}/\nu_{ng}$, |f1|/f and f3/f satisfy the conditional expressions (1), (2B), (4B), (5B) and (6) in this example.

On-axis chromatic aberration, astigmatism and an f-θ characteristic of the f-θ lens 6 having the aforementioned optical characteristics were measured by a method similar to that in the aforementioned first embodiment except the working wave range.

Figure 7:
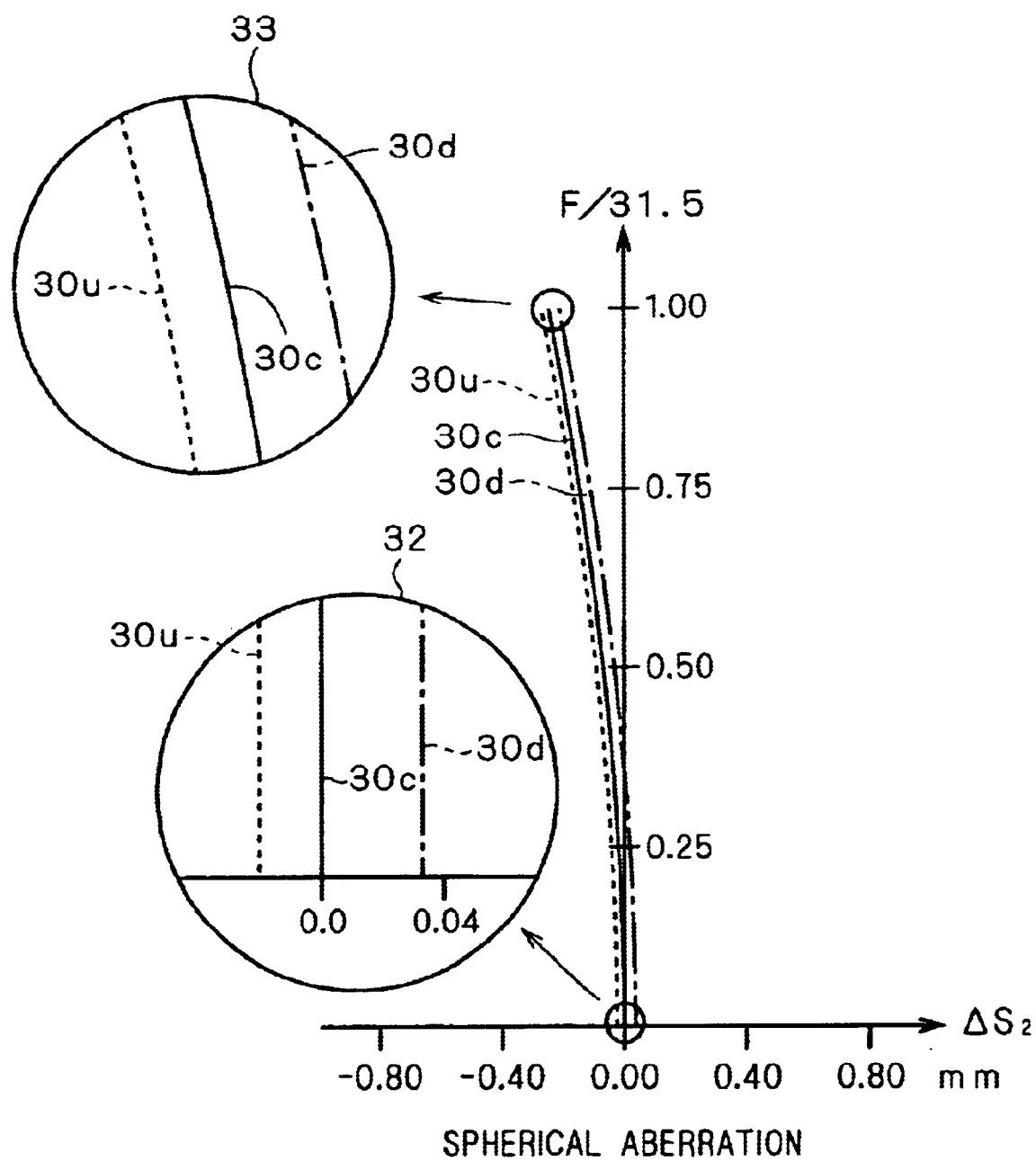
FIG. 7 is a spherical aberration diagram of an f-θ lens according to a second embodiment of the present invention.

FIG. 7 is a spherical aberration diagram related to the light beam having the working wave range of three wavelengths (625 nm, 635 nm and 645 nm). The aberration diagram shown in FIG. 7 plots aberration curves 30*c*, 30*u* and 30*d* with respect to the central, maximum and minimum wavelengths 635 nm, 645 nm and 625 nm respectively. Referring to FIG. 7, numeral 32 denotes a partially enlarged view showing the aberration curves 30*c*, 30*u* an 30*d* around pupil coordinates exhibiting the value zero and numeral 33 denotes a partially enlarged view showing the aberration curves 30*c*, 30*u* and 30*d* around pupil coordinates exhibiting the value "1". It has been recognized from the result of measurement of spherical aberration $\Delta S_2$ shown in FIG. 7 that on-axis chromatic aberration between the maximum wavelength 645 nm and the minimum wavelength 625 mm is 0.0528 mm and the on-axis chromatic aberration was properly corrected.

Figure 8:
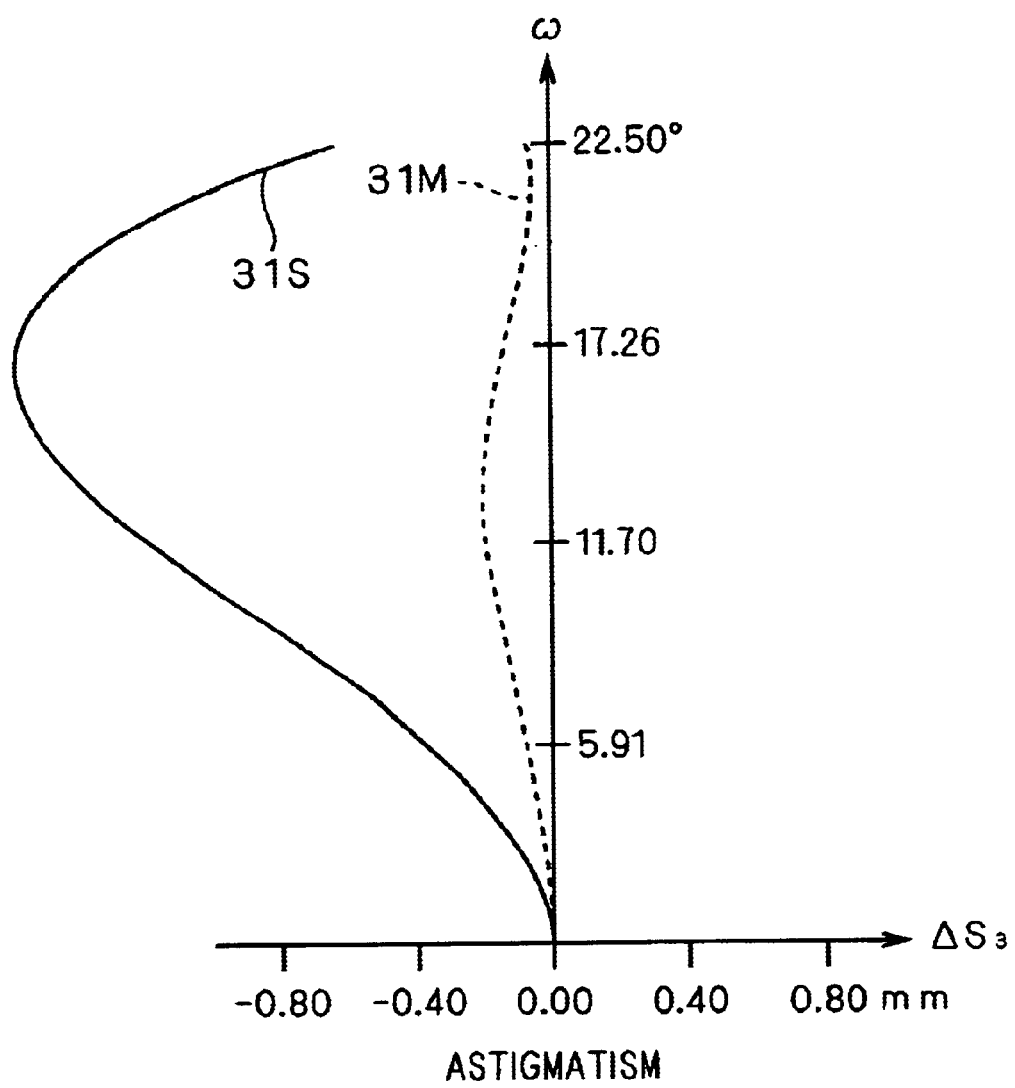
FIG. 8 is an astigmatism diagram of the f-θ lens according to the second embodiment.

FIG. 8 is an astigmatism diagram related to the light beam having the central wavelength of 635 nm. Referring to FIG. 8, numeral 31S denotes an aberration curve of a sagittal image surface and numeral 31M denotes an aberration curve of a meridional image surface. It is understood from FIG. 8 that the meridional image surface is relatively flatly corrected.

As to the f-θ characteristic of the f-θ lens 6 according to this example, an excellent numerical value of 0.25% was obtained. Table 7 shows measured values of each irradiated position $Y_n$, a distance $Y_{n+1}-Y_n$ and a ratio $D_n$.

$$1.40 \le \frac{\upsilon_{ps}}{\upsilon_{ng}} \le 1.70 \quad (4C)$$

$$0.26 \le \frac{|f1|}{f} \le 0.31 \quad (5C)$$

An example of the f-θ lens 6 according to this embodiment is now described. Table 9 shows the focal distance f and the F-number of the f-θ lens 6 according to this example and a working wave range of a laser beam oscillated by a light source 1.

TABLE 9

| | |
|---|---|
| F-Number | F/29.17 |
| Focal Distance (f) | f = 700 mm |
| Total Angle of View (θ) | 45° |
| Central Wavelength ($\lambda_0$) | $\lambda_0$ = 785 nm |
| Upper Limit of Working Wave Range ($\lambda_{max}$) | $\lambda_{max}$ = 800 nm |
| Lower Limit of Working Wave Range ($\lambda_{min}$) | $\lambda_{min}$ = 770 nm |

Table 10 shows values indicating optical characteristics of the f-θ lens 6 according to this example.

TABLE 7

| | | | | | $D_n = (Y_{n+1} - Y_n)/(W/10)$ | | | | | |
|---|---|---|---|---|---|---|---|---|---|---|
| n | 1 | 2 | 3 | 4 | 5 | 6 | 7 | 8 | 9 | 10 |
| $Y_{n+1}$ | 275.32579 | 220.26877 | 165.13525 | 110.03500 | 54.99650 | 0.00012 | −54.99621 | −110.03469 | −165.13506 | −220.26876 |
| $Y_n$ | 220.26877 | 165.13525 | 110.03500 | 54.99650 | 0.00012 | −54.99621 | −110.03469 | −165.13506 | −220.26876 | −275.32575 |
| $Y_{n+1} - Y_n$ | 55.05702 | 55.13352 | 55.10025 | 55.0385 | 54.99638 | 54.99633 | 55.03848 | 55.10037 | 55.1337 | 55.05699 |
| $D_n$ | 1.00104 | 1.00243 | 1.00182 | 1.00070 | 0.99993 | 0.99993 | 1.00070 | 1.00182 | 1.00243 | 1.00104 |

Table 8 shows the maximum value $D_{max}$, the minimum value $D_{min}$ and the arithmetic mean $D_{ave}$ of the ratio $D_n$ and the values of the f-θ characteristic calculated through the measured values in Table 7.

TABLE 8

| | |
|---|---|
| $D_{max}$ | 1.00243 |
| $D_{min}$ | 0.99993 |
| $D_{ave}$ | 1.00118 |
| f-θ Characteristic | 0.25% |

TABLE 10

| i | r(i) | d(i) | $n_d(i)$ | $v_d(i)$ |
|---|---|---|---|---|
| 1 | −134.49413 | 13.079979 | 1.67270 | 32.1 |
| 2 | ∞ | 17.950054 | | |
| 3 | −669.65370 | 18 | 1.63854 | 55.4 |
| 4 | −207.62857 | 0.5 | | |
| 5 | ∞ | 15 | 1.63854 | 55.4 |
| 6 | −203.33026 | | | |

Third Embodiment

An f-θ lens 6 according to a third embodiment of the present invention is now described. The f-θ lens 6 is designed to be preferable as to a light beam having a working wave range of a central wavelength of 785 nm, a maximum wavelength of 800 nm and a minimum wavelength of 770 nm. In order to optimize optical performance with respect to this working wave range in particular, the f-θ lens 6 preferably satisfies the following conditional expressions (2C), (4C) and (5C):

$$0.12 \le \frac{r1}{r3} \le 0.21 \quad (2C)$$

Numerical values of various ratios used in the above conditional expressions (1), (2), (4), (5) and (6) are as follows:

$$\begin{cases} L/f = 0.092 \\ r1/r3 = 0.201 \\ \upsilon_{ps}/\upsilon_{ng} = 1.543 \\ N_{ng} = 1.659229 \quad N_{ng1} = 1.658582 \quad N_{ng2} = 1.659911 \quad \upsilon_{ng} = 496.0338 \\ N_{ps} = 1.630629 \quad N_{ps1} = 1.630227 \quad N_{ps2} = 1.631051 \quad \upsilon_{ps} = 765.3264 \\ |f1|/f = 0.291 \quad f1 = -204.017170859 \\ f3/f = 0.460 \quad f3 = 322.424287586 \end{cases}$$

where $N_{ps}$ represents the refractive index of second and third lenses 8 and 9 with respect to the central wavelength 785 nm, $N_{ps1}$ represents the refractive index of the second and third lenses 8 and 9 with respect to the maximum wavelength 800 nm, $N_{ps2}$ represents the refractive index of the second and third lenses 8 and 9 with respect to the minimum wavelength 770 nm, $N_{ng}$ represents the refractive index of a first lens 7 with respect to the central wavelength 785 nm, $N_{ng1}$ represents the refractive index of the first lens 7 with respect to the maximum wavelength 800 nm and $N_{ng2}$ represents the refractive index of the first lens 7 with respect to the minimum wavelength 770 nm.

It is understood that the numerical values of ratios L/f, r1/r3, $v_{ps}/v_{ng}$, |f1|/f and f3/f satisfy the conditional expressions (1), (2C), (4C), (5C) and (6) in this example.

On-axis chromatic aberration, astigmatism and an f-θ characteristic of the f-θ lens 6 having the aforementioned optical characteristics were measured by a method similar to that in the aforementioned first embodiment except the working wave range.

Figure 9:
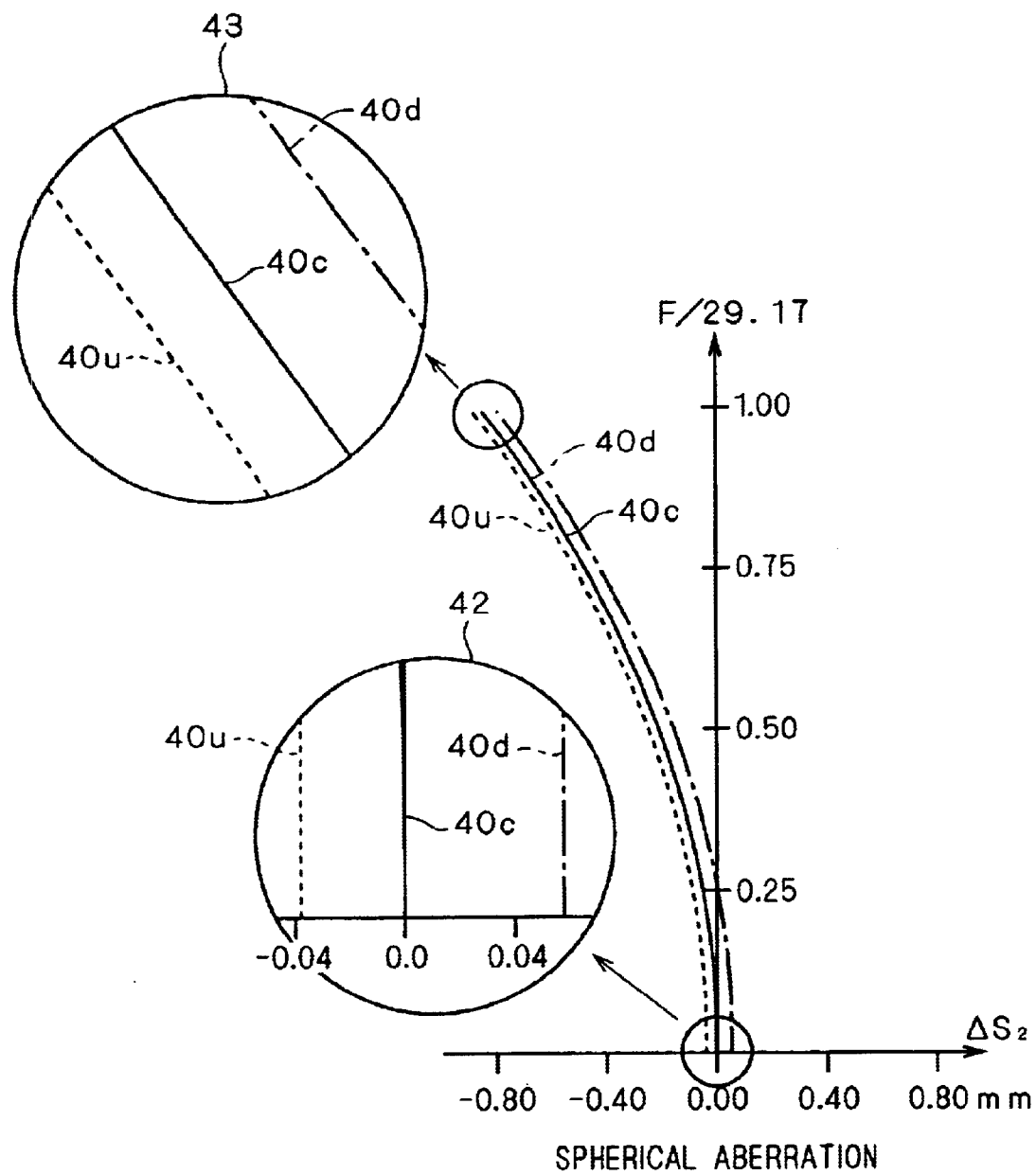
FIG. 9 is a spherical aberration diagram of an f-θ lens according to a third embodiment of the present invention.

FIG. 9 is a spherical aberration diagram related to the light beam having the working wave range of three wavelengths (770 nm, 785 nm and 800 nm). The aberration diagram shown in FIG. 9 plots aberration curves 40c, 40u and 40d with respect to the central, maximum and minimum wavelengths 785 nm, 800 nm and 770 nm respectively. Referring to FIG. 9, numeral 42 denotes a partially enlarged view showing the aberration curves 40c, 40u an 40d around pupil coordinates exhibiting the value zero and numeral 43 denotes a partially enlarged view showing the aberration curves 40c, 40u and 40d around pupil coordinates exhibiting the value "1". It has been recognized from the result of measurement of spherical aberration $\Delta S_2$ shown in FIG. 9 that on-axis chromatic aberration between the maximum wavelength 800 nm and the minimum wavelength 770 nm is 0.0956 mm and the on-axis chromatic aberration was properly corrected.

Figure 10:
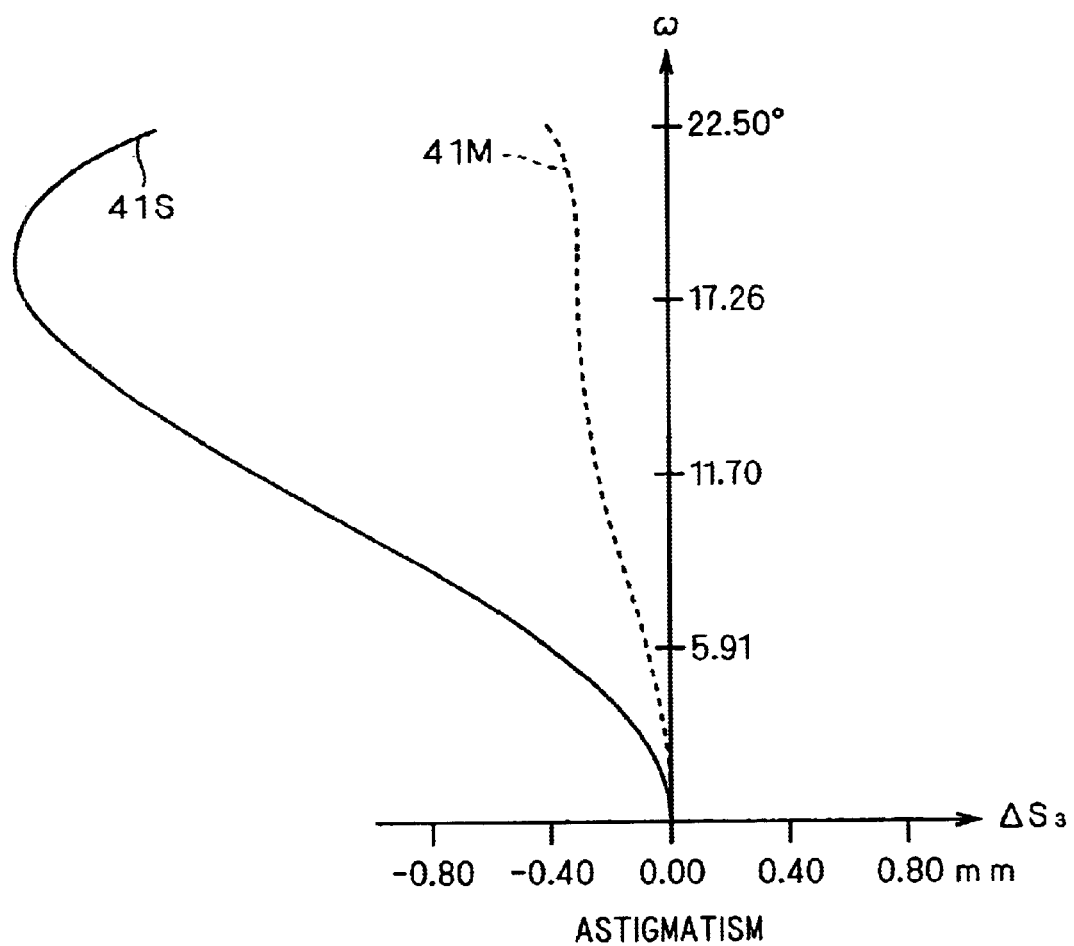
FIG. 10 is an astigmatism diagram of the f-θ lens according to the third embodiment.
Figure 11:
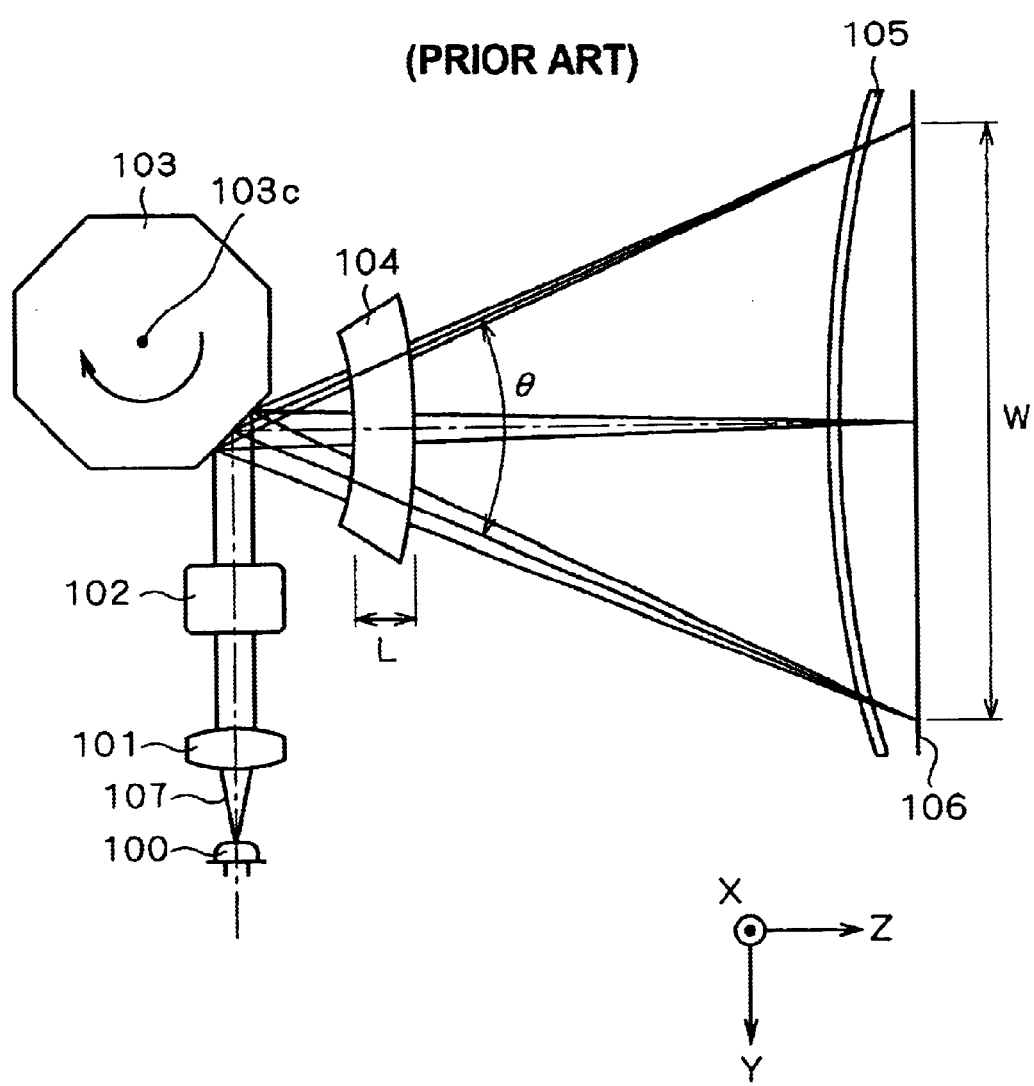
FIG. 11 is a diagram showing a conventional optical scanner developed along a Y-Z plane.
Figure 12:
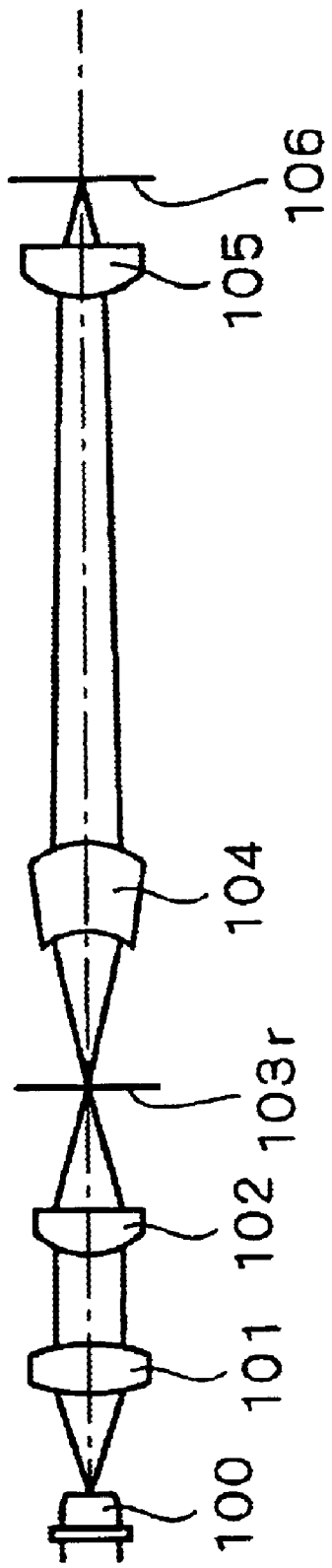
FIG. 12 is a longitudinal sectional of the optical scanner shown in FIG. 11 developed along an optical axis.
Figure 13:
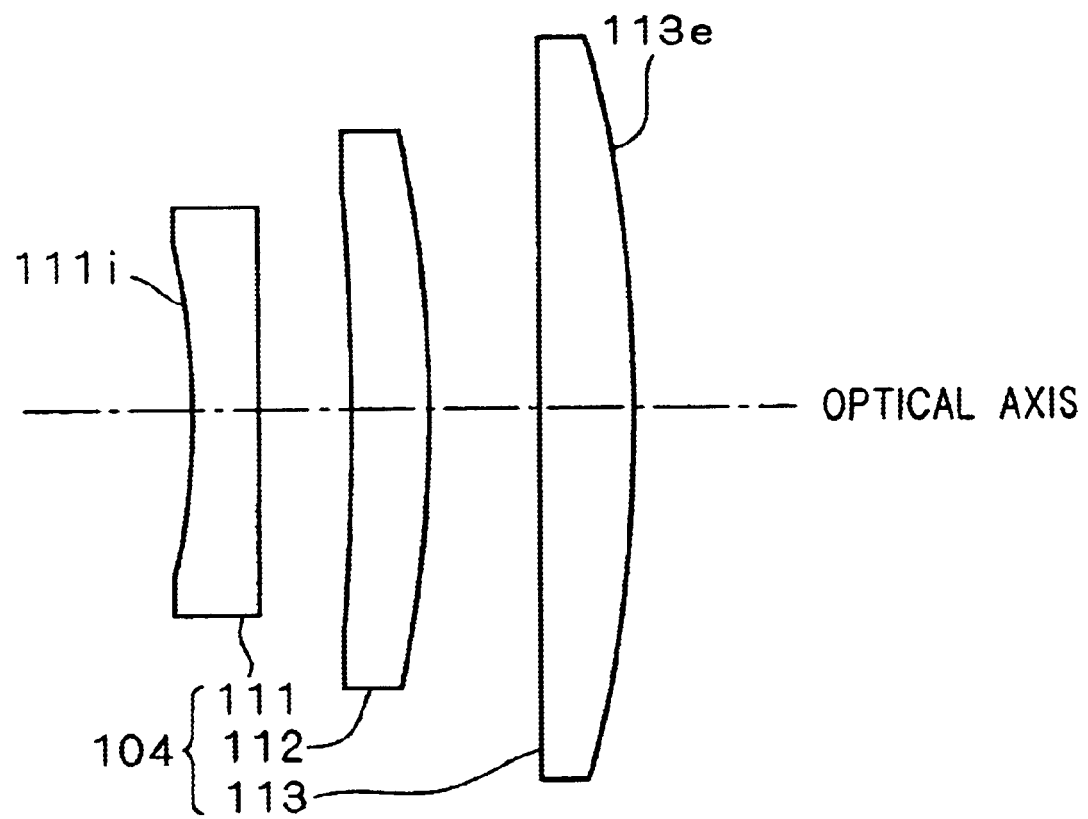
FIG. 13 is a schematic sectional view showing a conventional f-θ lens.

FIG. 10 is an astigmatism diagram related to the light beam having the central wavelength of 785 nm. Referring to FIG. 10, numeral 41S denotes an aberration curve of a sagittal image surface and numeral 41M denotes an aberration curve of a meridional image surface. It is understood from FIG. 10 that the meridional image surface is relatively flatly corrected.

As to the f-θ characteristic of the f-θ lens 6 according to this example, an excellent numerical value of 0.37% was obtained. Table 11 shows measured values each of irradiated position $Y_n$, a distance $Y_{n+1} - Y_n$ and a ratio $D_n$.

TABLE 11

| | | | | Dn = (Y$_{n+1}$ - Y$_n$)/(W/10) | | | | | |
|---|---|---|---|---|---|---|---|---|---|
| n | 1 | 2 | 3 | 4 | 5 | 6 | 7 | 8 | 9 | 10 |
| Y$_{n+1}$ | 275.46271 | 220.30616 | 165.12401 | 110.00971 | 54.97858 | -0.00015 | -54.97880 | -110.00977 | -165.12402 | -220.30617 |
| Y$_n$ | 220.30616 | 165.12401 | 110.00971 | 54.97858 | -0.00015 | -54.97880 | -110.00977 | -165.12402 | -220.30617 | -275.46266 |
| Y$_{n+1}$ - Y$_n$ | 55.15655 | 55.18215 | 55.1143 | 55.03113 | 54.97873 | 54.97865 | 55.03097 | 55.11425 | 55.18215 | 55.15649 |
| D$_n$ | 1.00285 | 1.00331 | 1.00208 | 1.00057 | 0.99961 | 0.99961 | 1.00056 | 1.00208 | 1.00331 | 1.00285 |

Table 12 shows the maximum value $D_{max}$, the minimum value $D_{min}$ and the arithmetic mean $D_{ave}$ of the ratio $D_n$ and the values of the f-θ characteristic calculated through the measured values in Table 11.

TABLE 12

| D$_{max}$ | 1.00331 |
|---|---|
| D$_{min}$ | 0.99961 |

TABLE 12-continued

| D$_{ave}$ | 1.00168 |
|---|---|
| f-θ Characteristic | 0.37% |

While the invention has been shown and described in detail, the foregoing description is in all aspects illustrative and not restrictive. It is therefore understood that numerous modifications and variations can be devised without departing from the scope of the invention.

What is claimed is:

1. An optical scanner comprising:
    a light deflector periodically reflecting a light beam emitted from a light source to periodically deflect said light beam; and
    an imaging optical system having such a distortion characteristic that the product of a focal distance and a half angle of view defines an ideal image height for imaging said light beam deflected by said light deflector on an objective surface,
    said imaging optical system comprising a first lens having negative refracting power, a second lens having positive refracting power and a third lens having positive refracting power successively from an entrance side for said light beam to satisfy the following expressions (1) and (2):

$$\frac{L}{f} < 0.100 \quad (1)$$

$$0.10 \leq \frac{r1}{r3} \leq 0.26 \quad (2)$$

where
    L represents the length between a plane of incidence of said first lens and a plane of exit of said third lens along an optical axis direction,
    f represents the composite focal distance of said first lens, said second lens and said third lens in the above expression (1),
    r1 represents the radius of curvature of a refracting interface on the entrance side for said light beam in said first lens, and
    r3 represents the radius of curvature of a refracting interface on the entrance side for said light beam in said second lens in the above expression (2).

2. The optical scanner according to claim 1, wherein
    said first lens, said second lens and said third lens are made of an optical material satisfying the following expression (4) on the basis of a partial Abbe's number v defined in the following expression (3):

$$v = \frac{N_A - 1}{N_{MIN} - N_{MAX}} \quad (3)$$

-continued $$1.40 \leq \frac{v_{ps}}{v_{ng}} \leq 1.70 \quad (4)$$

where
- $N_A$ represents a refractive index with respect to the central wavelength of a working wave range of said light beam,
- $N_{MIN}$ represents a refractive index with respect to the lower limit of the working wave range of said light beam,
- $N_{MAX}$ represents a refractive index with respect to the upper limit of the working wave range of said light beam in the above expression (3),
- $v_{ps}$ represents the partial Abbe's number of said second lens and said third lens, and
- $v_{ng}$ represents the partial Abbe's number of said first lens in the above expression (4).

3. The optical scanner according to claim 2, wherein said imaging optical system satisfies the following expression (5):

$$0.26 \leq \frac{|f1|}{f} \leq 0.33 \quad (5)$$

where f1 represents the focal distance of said first lens in the above expression (5).

4. The optical scanner according to claim 3, wherein said imaging optical system is formed to satisfy the following expression (6):

$$0.41 \leq \frac{f3}{f} \leq 0.66 \quad (6)$$

where f3 represents the focal distance of said third lens in the above expression (6).

5. The optical scanner according to claim 4, wherein another imaging optical system converging said light beam emitted from said light source only in the direction of the rotational axis of said light deflector and imaging said light beam on a reflecting surface of said light deflector is further provided on an optical path between said light source and said light deflector, and said imaging optical system further comprises an anamorphic lens converging a light beam outgoing from said third lens in the direction of the rotational axis of said light deflector and imaging said light beam on said objective surface.

6. The optical scanner according to claim 5, wherein said light beam has a central wavelength of around 405 nm, and said imaging optical system satisfies the following expression (2A):

$$0.10 \leq \frac{r1}{r3} \leq 0.26. \quad (2A)$$

7. The optical scanner according to claim 6, wherein said optical material satisfies the following expression (4A) with respect to said light beam having said central wavelength of around 405 nm:

$$1.44 \leq \frac{v_{ps}}{v_{ng}} \leq 1.70. \quad (4A)$$

8. The optical scanner according to claim 7, wherein said imaging optical system satisfies the following expression (5A) with respect to said light beam having said central wavelength of around 405 nm:

$$0.28 \leq \frac{|f1|}{f} \leq 0.33. \quad (5A)$$

9. The optical scanner according to claim 5, wherein said light beam has a central wavelength of around 635 nm, and said imaging optical system satisfies the following expression (2B):

$$0.11 \leq \frac{r1}{r3} \leq 0.25. \quad (2B)$$

10. The optical scanner according to claim 9, wherein said optical material satisfies the following expression (4B) with respect to said light beam having said central wavelength of around 635 nm:

$$1.50 \leq \frac{v_{ps}}{v_{ng}} \leq 1.62. \quad (4B)$$

11. The optical scanner according to claim 10, wherein said imaging optical system satisfies the following expression (5B) with respect to said light beam having said central wavelength of around 635 nm:

$$0.30 \leq \frac{|f1|}{f} \leq 0.33. \quad (5B)$$

12. The optical scanner according to claim 5, wherein said light beam has a central wavelength of around 785 nm, and said imaging optical system satisfies the following expression (2C):

$$0.12 \leq \frac{r1}{r3} \leq 0.21. \quad (2C)$$

13. The optical scanner according to claim 12, wherein said optical material satisfies the following expression (4C) with respect to said light beam having said central wavelength of around 785 nm:

$$1.40 \leq \frac{v_{ps}}{v_{ng}} \leq 1.70. \quad (4C)$$

14. The optical scanner according to claim 13, wherein said imaging optical system satisfies the following expression (5C) with respect to said light beam having said central wavelength of around 785 nm:

$$0.26 \leq \frac{|f1|}{f} \leq 0.31. \quad (5C)$$

* * * * *